UNITED STATES PATENT OFFICE.

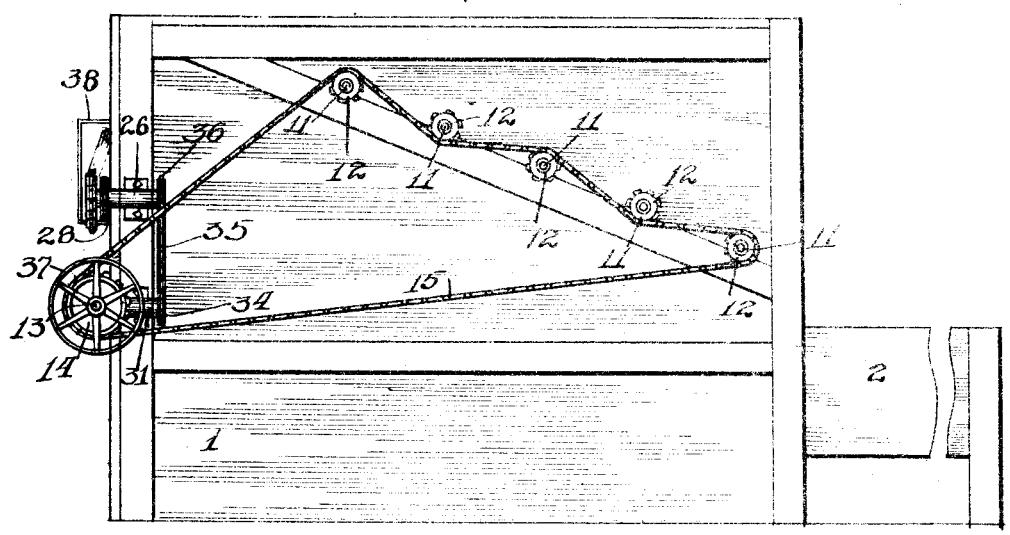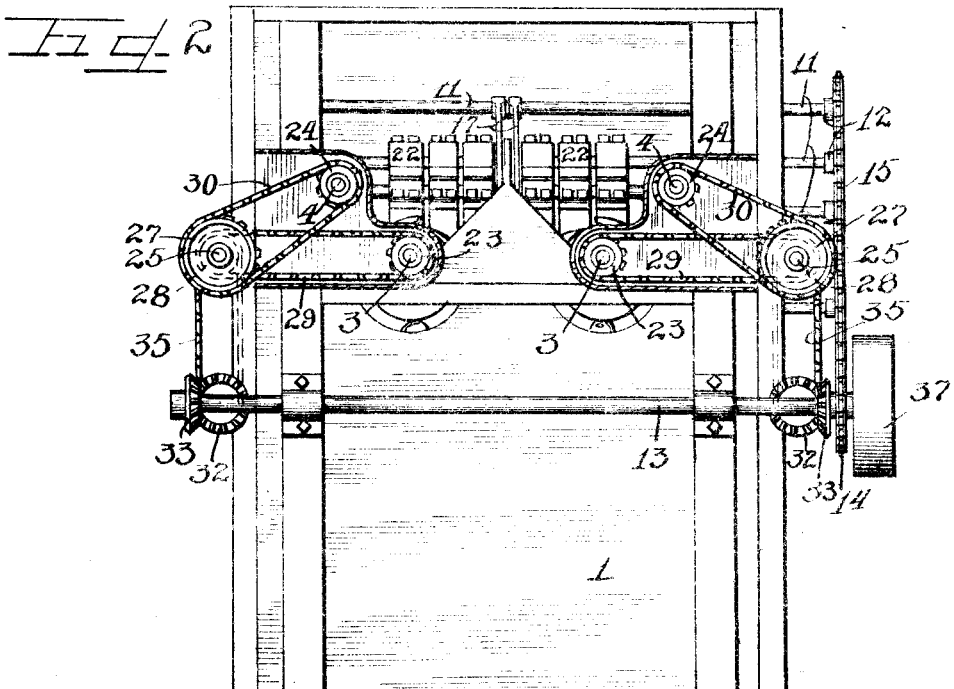

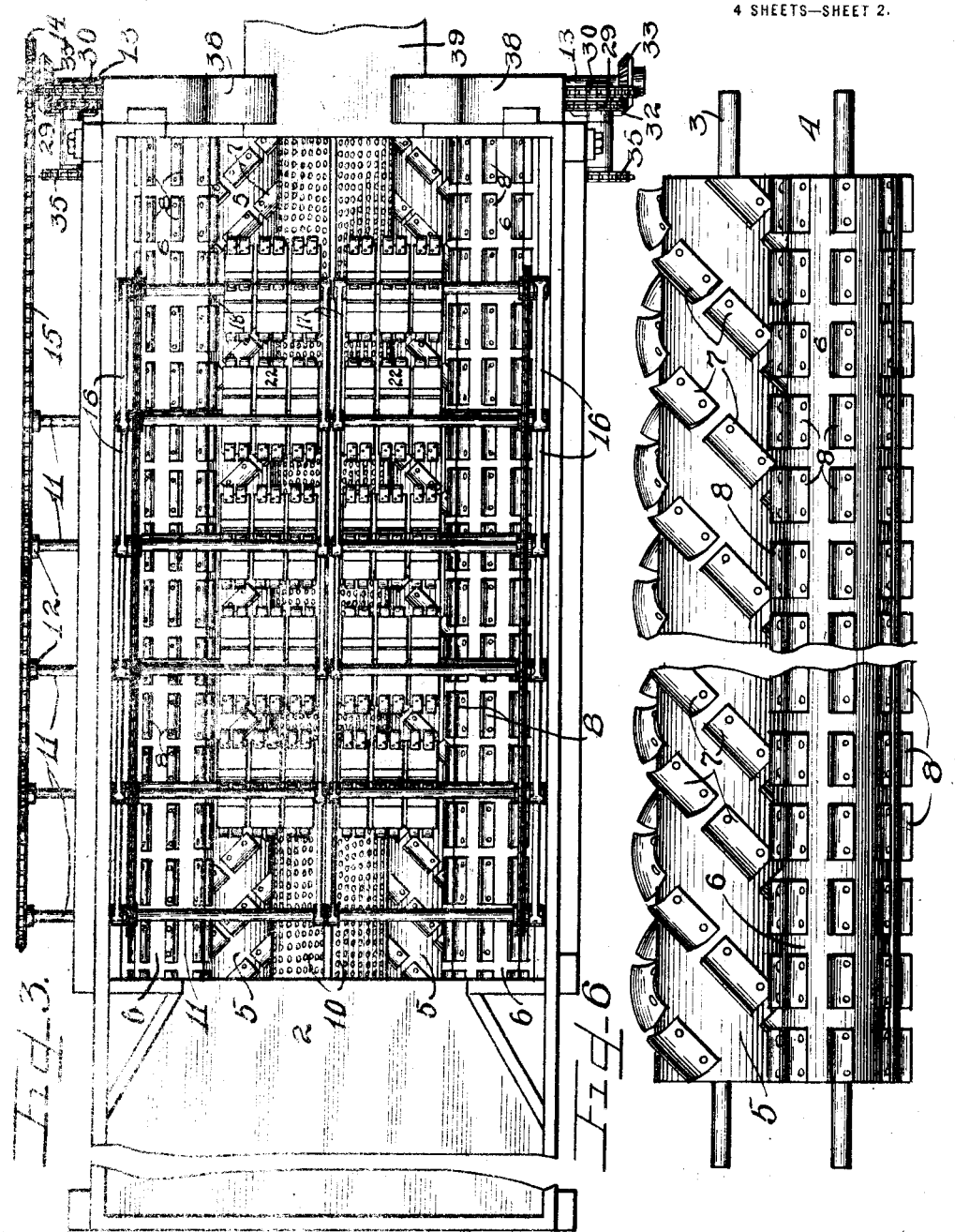

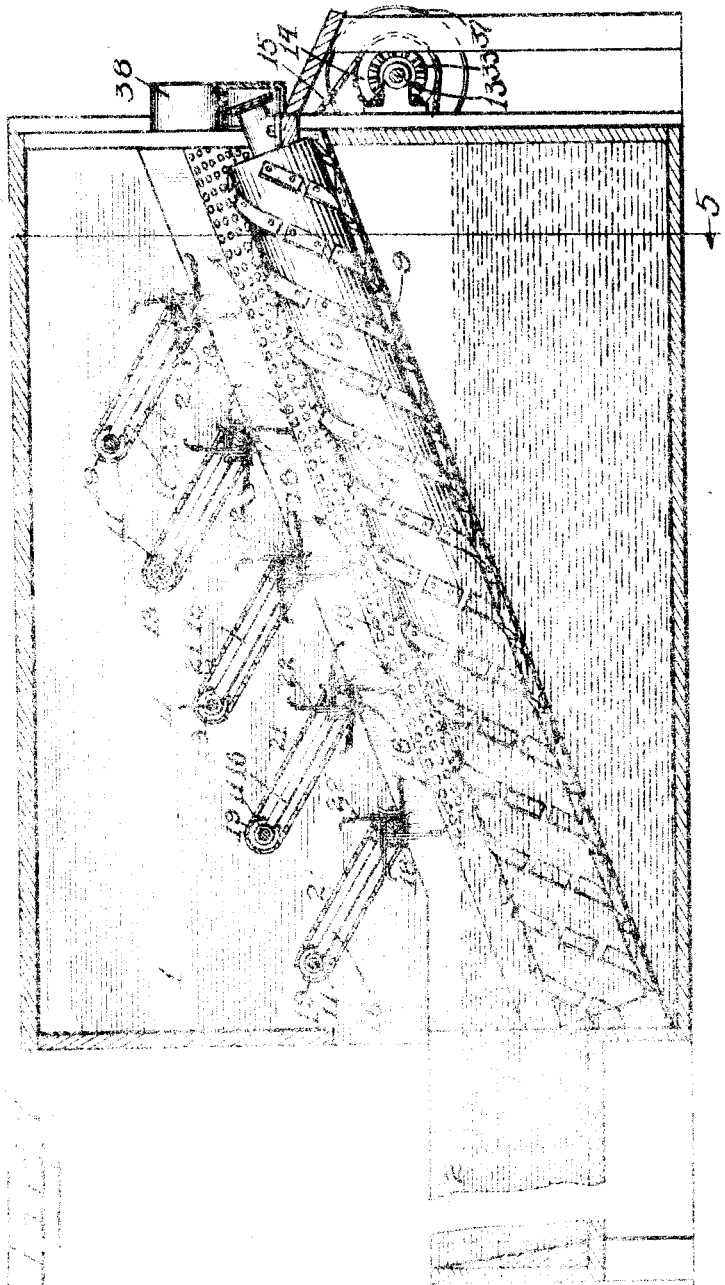

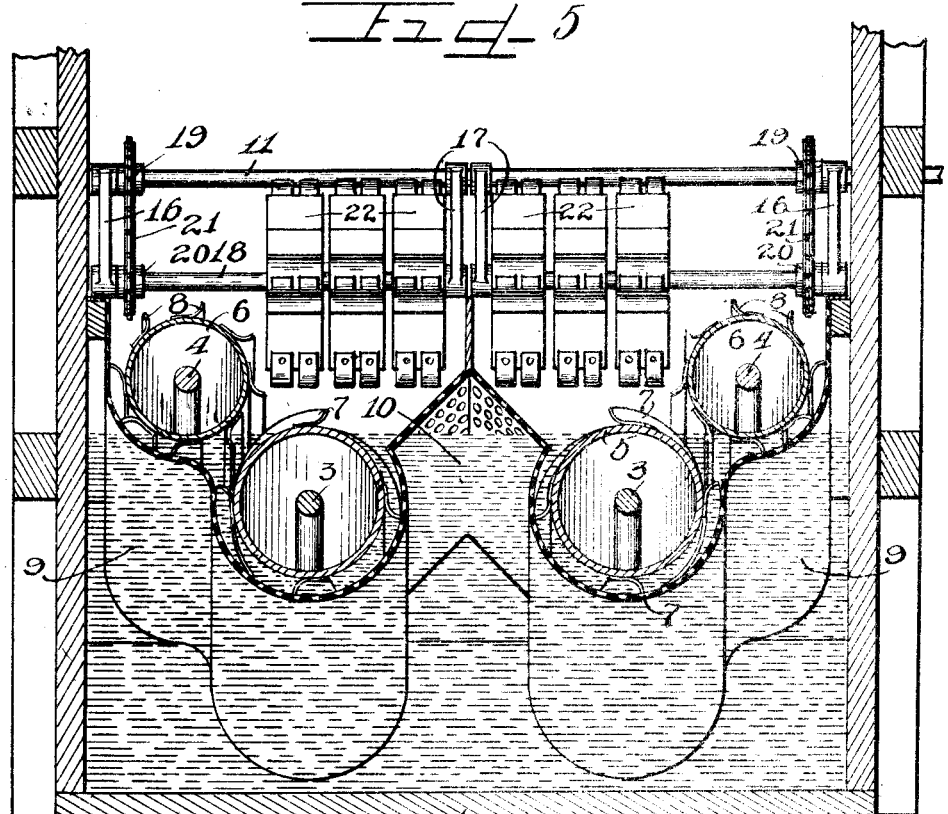

JOHN W. KOHLHEPP, OF CHICAGO, ILLINOIS, ASSIGNOR TO THE ALLBRIGHT-NELL COMPANY, A CORPORATION OF ILLINOIS.

SCRAPING-MACHINE.

1,180,853.

Specification of Letters Patent. Patented Apr. 25, 1916.

Application filed March 21, 1914. Serial No. 826,226.

*To all whom it may concern:*

Be it known that I, JOHN W. KOHLHEPP, a citizen of the United States, and a resident of the city of Chicago, in the county of Cook and State of Illinois, have invented certain new and useful Improvements in Scraping-Machines; and I do hereby declare that the following is a full, clear, and exact description of the same, reference being had to the accompanying drawings, and to the numerals of reference marked thereon, which form a part of this specification.

This invention relates to that class of hog scraping machines in which the carcass is simultaneously supported, rotated, scraped and advanced through the machine by coöperative rolls assisted in their operation by adjustably mounted beater mechanisms. By utilizing the supporting and conveying means as a scraping mechanism, the dehairing operation is greatly facilitated and a much less time is required to dehair the hog than where separate mechanisms for conveying and scraping are provided.

This invention has for its object mechanisms for receiving a hog or carcass floated thereon and advancing and elevating the same out of the water in the tank while subjecting the same to the action of a number of adjustable beating mechanisms, alternate ones of which are driven in the same direction and adjacent ones oppositely, and in which the elevating and conveying mechanism act efficiently to dehair the carcass during its progress through the machine.

It is an object of this invention to construct a machine wherein a plurality of similarly constructed and symmetrically disposed rolls are mounted in inclined position in a tank, each pair of rolls adapted to receive a carcass and handle the same independently to convey and scrape the carcass while continually rotating the same and subjecting the carcass to the action of a number of beaters disposed above the rolls.

It is also an object of this invention to provide a machine of double capacity, that is to say the same tank is used to contain the hot water in which the carcasses are immersed prior to their introduction on to the scraping mechanisms, there being duplicate sets of scraping mechanisms, each one adapted to handle a carcass independently of the other.

It is also an object of this invention to construct mechanisms for supporting and conveying a carcass longitudinally while continually rotating the same, and with beaters adjustably mounted to swing longitudinally of the carcass to dehair and polish the same.

It is also an object of this invention to construct a device wherein a plurality of adjustable beater mechanisms are mounted above inclined supporting and scraping rolls driven at different speeds, in a manner such that adjacent beaters above said rolls operate in opposite directions upon the carcass as it passes through the machine.

It is furthermore an object of this invention to construct a machine wherein a plurality of coöperative inclined scraping, supporting and conveying rolls for the carcasses are mounted adjacent one another in parallel relation, and with a partition separating the pairs of rolls, permitting each pair to operate independently upon a carcass.

It is finally an object of this invention to embody in a single machine duplicate sets of dehairing mechanism driven simultaneously and adapted to operate independently on different carcasses passing therethrough.

The invention (in a preferred form) is illustrated in the drawings and hereinafter more fully described.

In the drawings: Figure 1 is a side elevation of a device embodying the principles of my invention. Fig. 2 is an end elevation of the discharge end thereof. Fig. 3 is a top plan view of the device with the top wall removed. Fig. 4 is a longitudinal, central vertical section taken through a device with parts in elevation. Fig. 5 is a transverse vertical section taken on line 5—5 of Fig. 4, with parts omitted. Fig. 6 is a detail showing in plan a pair of coöperative scraping and conveying rollers.

As shown in the drawings, the machine embraces a substantially rectangular tank 1, which, at the entrance end, communicates with a scalding tank 2, from which the carcasses are received to be operated upon. Mounted in said tank 1, and inclining upwardly from the entrance end toward the discharge end are shafts 3 and 4, respectively, and secured upon said shafts to rotate therewith are scraping and conveying rolls 5 and 6, respectively. As shown, there are two of each of said shafts 3 and 4, and likewise two of each of said rollers 5 and 6, The duplication of the respective rollers 5 and 6, is to double the capacity of the machine and embody the mechanisms in a single tank, the operation and construction of each of the parts of the mechanisms being exactly similar. Said shafts 3 and 4, are mounted in such a manner within the tank 1, that the roller 5, is below and to one side of the roller 6, and, as shown, is of larger diameter than said roller 6. Secured upon the surface of each of the rollers 5, are a plurality of scraping members 7, arranged thereon in the form of a continuous helix, so that upon contacting with a carcass they not only serve to scrape the same, but also to advance the carcass longitudinally of the roller. Each of the rollers 6, is provided with scrapers arranged in straight lines thereon, so that with rotation of said latter rollers a carcass which is supported mainly upon the roller 5, in a longitudinal position, is scraped transversely by the scrapers on the roller 6.

A perforated sheet metal casing member is bent around beneath each of the respective rolls 5 and 6, to conform to the curvature thereof, as indicated by the reference numeral 9, and is bent upwardly centrally of the machine between the two rolls 5, extending upwardly therebetween to afford a partition 10, the sides of which slope toward said rolls 5. Journaled within said tank 1, transversely thereof, and at points in a line substantially parallel said shafts 3 and 4, are a series of shafts, each denoted by the reference numeral 11, and having secured on its end on the exterior of the casing 1, a sprocket wheel 12. A main driving shaft 13, is journaled across the discharge end of the machine, and secured thereon is a sprocket wheel 14, over which is trained a chain 15, said chain also being engaged upon the respective sprocket wheels 12, in the manner shown in Fig. 1, so that adjacent shafts 11, are caused to rotate in opposite directions. Two pairs of swinging arms, denoted respectively by the reference numerals 16 and 17, are mounted upon each of said shafts 11, and support at their ends beater or scraper shafts 18, journaled therein with one shaft disposed over each of the respective rolls 5 and 6. Sprocket wheels 19, are keyed upon said shaft 11, near each end thereof adjacent the arms 16, and likewise sprocket wheels 20, are secured upon the shafts 18, and a chain 21, is trained over said sprocket wheels to transmit an independent drive to each of said shafts 18, from said shaft 11.

A plurality of beaters, each consisting of four resilient arms 22, are secured upon each of said shafts 18, and at their ends are tipped with steel scrapers. It is readily apparent from the construction described that each of the shafts 18, is permitted an independent pivotal movement about the respective supporting and driving shaft 11, and the gears 19 and 20, and chain 21, which transmit the drive from the shaft 11, to said shaft 18, permit adjustment of said latter shaft without interfering with the drive.

Rigidly secured upon the upper or forward ends of the shafts 3, are sprocket wheels 23, and likewise sprocket wheels 24, are secured upon the upper forward ends of said shafts 4, on the exterior of the casing at the discharge end. Short stud shafts 25, are journaled in bearings 26, on each side of the casing, and are each provided at one end with a large and small sprocket wheel, denoted respectively by the reference numerals 27 and 28, of which the large sprocket wheel 27, is connected to the sprocket 24, by means of a chain 30, and the small sprocket 28, is connected to the sprocket 23, by means of a chain 29. A bearing bracket 31, similar to the bearing bracket 26, is secured upon each side of the casing directly below said bearing bracket 26, and is likewise provided with a short stud shaft on one end of which is a bevel pinion 32, which meshes with a pinion 33, rigidly secured upon the main driving shaft 13, to receive power therefrom. On the other end of the stub shaft supporting the pinion 32, is a sprocket wheel 34, and a chain 35, is trained over said sprocket wheel and a similar sprocket wheel 36, upon the end of the shaft 25, in said bearing bracket 26, whereby the drive from the main shaft 13, is transmitted through said bevel pinions and sprocket wheels and chains to the respective roller shafts 3 and 4.

Of course, the respective sprocket wheels 27 and 28, are in a vertical plane, whereas the pinions 23 and 24, are inclined in a plane which is at right angles to the inclined shafts 3 and 4, but, due to the flexibility of the chains which connect the respective sprocket wheels one to another, it is possible to transmit the power, although the connected sprocket wheels are in different planes. A driving pulley 37, is provided on the end of the power shaft 13, to receive power from any suitable source, such as a motor. Casings 38, are mounted on the tank to protect the sprocket wheels and chains on the machine, and permitting the carcasses as they are ejected to rest upon said casings in their passage to an inclined receiving table 39, which projects over the main drive shaft 13, and the driving gears and sprockets thereon.

The operation is as follows: The carcasses are floated into the machine from the scalding tank 2, and upon contacting with the rollers are carried upwardly thereby. Of course, the carcass received upon either of the respective pairs of rollers 5 and 6, is advanced longitudinally thereon, preferably head first, up toward the discharge end of the machine, and is continuously rotated longitudinally by the rolls, as well as scraped thereby. The inclined walls 10, and the rolls 6, serve to guide a carcass through the machine as it is moved along and scraped by the respective rolls 5, and of course the beaters 22, adjacent ones of which strike downwardly and upwardly respectively on the carcass, adjust themselves to a height dependent upon the size of the carcass by a pivotal movement of the respective beater shafts 18, about the driving and pivotal supporting shafts 11. The hair and refuse scraped from the carcass is collected on the sheathing 9, beneath the respective rolls 5 and 6, and is thrust upwardly therealong and discharged at the front end of the machine beneath the table 39, where it can be collected in any suitable receptacle for the purpose. Of course, each of the shafts 11, afford a pivotal support, as well as a drive for the respective beater shafts disposed over each of the pairs of coöperative rolls 5 and 6, but, due to the independent mounting of each of said beater shafts, it is immaterial whether the carcasses passing through the machine are of the same size or similarly positioned upon the duplicate dehairing mechanisms.

I am aware that various details of construction may be varied through a wide range without departing from the principles of this invention. I therefore do not purpose limiting the patent granted otherwise than necessitated by the prior art.

I claim as my invention:

1. In a device of the class described duplicate pairs of conveying and scraping rollers mounted in inclined position, a double partition mounted therebetween acting to assist in maintaining a carcass longitudinally disposed upon one pair of said rollers, a plurality of pairs of beaters mounted at different heights, one beater of each pair over one pair of rollers, and the other beater over the other pair of rollers, and each equi-distant from the axes of said conveying rollers, and a single driving and supporting shaft for each pair of beaters.

2. In a device of the class described duplicate conveying and scraping mechanisms mounted in inclined position, means driving each one of said duplicate mechanisms simultaneously, a driving pivot shaft mounted above said duplicate mechanisms, and independent beater shafts, one for each of said conveying mechanisms, swingingly supported on said pivot shaft and driven therefrom and each acting independently of the other.

3. In a device of the class described a plurality of pairs of coöperative inclined rollers to support and scrape a carcass, a double partition having inclined walls disposed between and acting to support first pairs of rolls and coacting with each pair in maintaining the carcasses properly disposed for scraping, dehairing mechanisms mounted above said rolls adapted to contact a carcass supported on said rolls, comprising pairs of beaters, one beater of each pair disposed over one pair of rollers, and the other beater of each pair disposed over the other pair of rollers, and unitary driving and supporting means for the beaters of each pair of beaters.

4. In a device of the class described a plurality of pairs of rolls, each pair adapted to independently convey and scrape a carcass, said rolls mounted inclined and parallel with one another to carry the carcass lengthwise thereon, an inclined partition member disposed between said pairs of rolls to assist in maintaining the carcasses properly positioned on both pairs of rolls, beating mechanism mounted above said rolls acting both with and against the movement of the carcass to dehair the same, said beating mechanism comprising driving shafts extending over both pairs of rolls, and beaters, one over each pair of rolls, swung therefrom and driven thereby.

5. In a device of the class described a plurality of pairs of inclined rolls, one roll of each pair mounted slightly above the other, a double partition between said pairs of rolls assisting in supporting and guiding a carcass moved lengthwise in inclined position upon a pair of said rolls each pair of rolls adapted to operate upon a carcass, adjustable beating mechanisms one over each pair of rolls adapted to coöperate therewith to dehair the carcass, and a common drive and pivot shaft for each pair of said beating mechanisms.

6. In a device of the class described duplicate conveying and scraping mechanisms mounted in inclined position, partition means mounted therebetween acting to assist in maintaining carcasses longitudinally disposed upon each of said mechanisms, a plurality of pairs of swingingly supported beaters mounted at different heights, each normally equi-distant from an axis of said conveying mechanisms, and common driving and supporting means for each of said beaters of a pair of beaters.

7. In a device of the class described duplicate conveying scraping mechanisms mounted side by side, means driving each one of said duplicate mechanisms simultaneously, driving pivot shafts mounted transversely above and each extending entirely across said duplicate mechanisms, and pairs of independent beater shafts one pair over each of said mechanisms, swingingly supported on each of said pivot shafts and driven therefrom and each beater shaft pivotally movable independently of the others.

8. In a device of the class described, a main conveying and scraping roll, means for rotating the same, an auxiliary scraping roll adjacent thereto and at a higher level than the main roll and having its axis parallel thereto, means for rotating the same, and a fixed partition on the opposite side of the main roll from the auxiliary roll, said main roll, auxiliary roll, and fixed partition being so arranged as to form a trough through which the carcass is conveyed and scraped, and beating mechanism operating therewith to scrape the carcass.

9. In a device of the class described, a main conveying and scraping roll, means for rotating the same, an auxiliary scraping roll adjacent thereto and having its axis parallel thereto and at a different height than said main roll, means for rotating the same, and a partition means co-acting with said main and auxiliary rolls to afford a trough through which a carcass is conveyed and scraped.

10. In a device of the class described a plurality of pairs of inclined rolls, one roll of each pair mounted slightly above the other, a partition between said pairs of rolls adapting a carcass to be moved lengthwise in inclined position upon one of a pair of said rolls, and supported in position by the other roll and said partition, each pair of rolls adapted to operate independently upon a carcass, independently adjustable beating mechanisms arranged in pairs, each mechanism adapted to coöperate with a pair of rolls to dehair the carcass, and a common drive and pivot shaft for each pair of beating mechanisms.

11. In a machine of the class described, a main conveying roll, means for rotating the same, an auxiliary scraping roll with its axis parallel to said main roll disposed at one side thereof, and a partition member disposed on the other side of said main roll, the arrangement of said rolls and partition member affording a trough through which a carcass is conveyed, rotated and dehaired.

12. In a machine of the class described, a main conveying and scraping roll, an auxiliary supporting roll mounted adjacent thereto with its axis parallel to the axis of said main roll, means for driving said respective rolls, a partition member disposed at the other side of said main roll from said auxiliary roll, the arrangement of said rolls and partition affording a trough for conveyance of a carcass therethrough, and scraping devices for operating on the carcass during its passage on said rolls.

13. In a machine of the class described, a main conveying and scraping roll, an auxiliary supporting roll disposed parallel and adjacent said main roll at one side thereof, partition means on the other side of said main roll, said partition and said rolls affording a trough for conveyance of a carcass therethrough due to the movement of said rolls, and dehairing mechanisms adjustably mounted to operate upon the carcass during its passages along on said rolls, said mechanisms adjusting themselves automatically to different heights according to the size of the carcass operated upon.

14. In a machine of the class described, a main conveying and scraping roll, means for rotating the same, an auxiliary scraping roll adjacent and parallel to said main roll on one side thereof and at a different height than said main roll, a partition member on the other side of said main roll from said auxiliary roll, the arrangement of said partition and said rolls affording a trough for conveyance of a carcass therethrough, and a plurality of swingingly mounted rotatable beater devices adapted to operate on the carcass during its passage along on said rolls.

15. In a device of the class described, a main inclined conveying and scraping roll, means for rotating the same, an auxiliary scraping roll inclined and parallel to said main roll, means for rotating the same, a partition member co-acting with said rolls to afford a trough for transference of a carcass therethrough while dehairing the same, and beating mechanisms mounted above said rolls adapted to operate on a carcass transferred therealong.

In testimony whereof I have hereunto subscribed my name in the presence of two subscribing witnesses.

JOHN W. KOHLHEPP.

Witnesses:
  CHARLES W. HILLS, Jr.,
  LEON M. REIBSTEIN.